H. V. WELCH.
METHOD FOR THE RECOVERY OF METALLIC VALUES FROM SLAG.
APPLICATION FILED SEPT. 7, 1920.
1,414,491. Patented May 2, 1922.
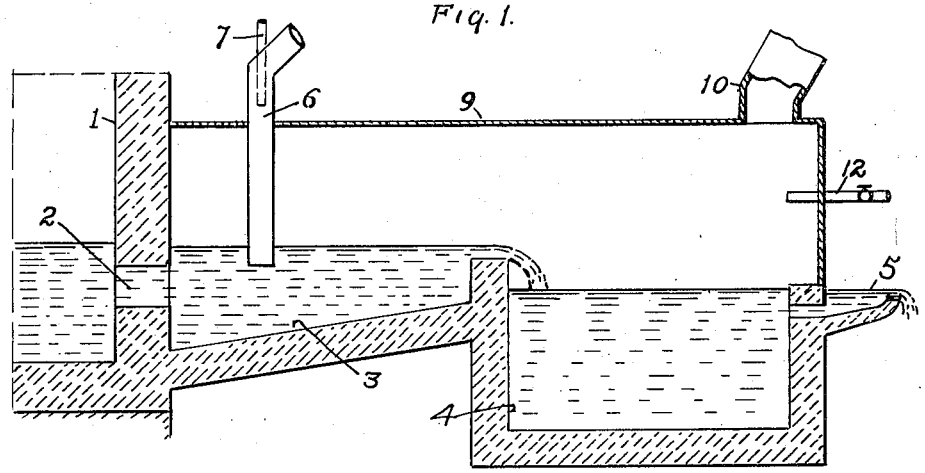
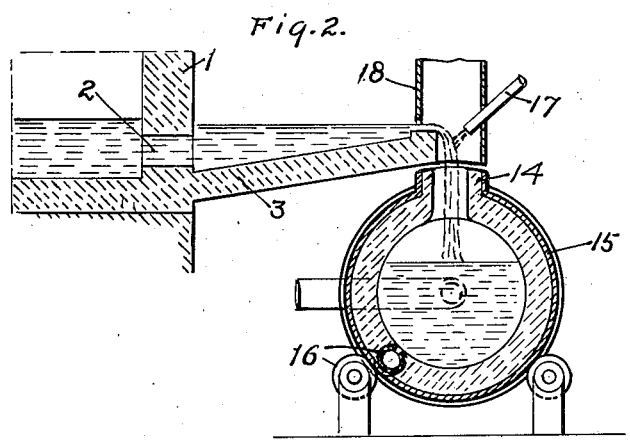
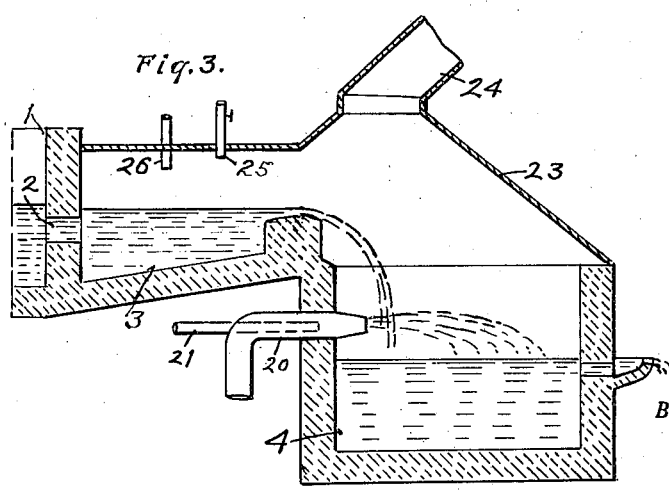
INVENTOR.
Harry V. Welch
BY Arthur P. Knight
ATTORNEYS.

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD FOR THE RECOVERY OF METALLIC VALUES FROM SLAG.

1,414,491.   Specification of Letters Patent.   Patented May 2, 1922.

Application filed September 7, 1920. Serial No. 408,636.

*To all whom it may concern:*

Be it known that I, HARRY V. WELCH, a citizen of the United States, residing at Los Angeles, in the county of Los Angeles and State of California, have invented a new and useful Method for the Recovery of Metallic Values from Slag (Case A), of which the following is a specification.

This invention relates to the recovery of metallic values from metallurgical slags. In the present art and practice of winning copper and lead and associated metals from their ores by smelting or furnacing operations, a definite percentage is normally lost with the residues. For example, in the smelting of copper ores, where the roasted ore product or calcine is heated in reverberatory furnace, the resulting product contains two fractions: first, a copper-iron sulfide product known as matte and containing the valuable constituents, which are later refined in a converter for production of substantially pure metallic copper; and, second, a waste product known as slag, and which is normally economically valueless and is discharged to a waste dump.

The main object of the present invention is to provide for recovery of the metallic values in such slag in economical and commercially practicable manner. This object I attain by causing the slag, while still at a high temperature and in fluid condition, to be brought in contact with a halogen-bearing material to convert the copper wholly or partially to the form of a halide, which is wholly or partially volatilized and is collected or recovered in any suitable manner.

While especially applicable to copper smelting, the present invention is also applicable to all melting down, reduction or oxidation furnace operations in which a molten slag is discharged, carrying in the slag either dissolved, or as suspended articles, a fractional part of the valuable metallic constituents, when said metallic elements of value are of a type which, in their existing form in the slag, are capable of conversion to halide form in the presence of suitable halidizing agents, and of oxidizing agents, if necessary, and under suitable temperature conditions.

My process may be carried out in various forms of apparatus, for example, several forms of apparatus suitable for this purpose being illustrated in the accompanying drawings, but it is to be understood that I may use other apparatus, or modifications of these, as may prove desirable, or render more effective the application of the process.

Referring to the drawings, Fig. 1 is a vertical section of one form of such apparatus in which the volatilization of the metallic values is effected in stationary tank means;

Fig. 2 is a vertical section of another form of apparatus in which the volatilization is effected in an apparatus of the converter type;

Fig. 3 is a vertical section of an apparatus adapted to effect volatilization of the metallic values in the slag while the slag is broken up into finely divided condition by spraying action, or the like.

A simple form of apparatus suitable for carrying out the invention is shown in Fig. 1, wherein 1 indicates a settling chamber for receiving the slag or melted product from a reverberatory or blast furnace, which is connected by an outlet passage 2 to an overflow or outlet tank or launder 3 from which the slag overflows into a settling tank or settler 4, having an overflow 5 for the waste slag.

Means may be provided for settling or injecting suitable chloridizing or halidizing agents into any of the devices 1, 3 or 4, for example, as shown in Fig. 1, a pipe or conduit 6 may extend into the body of slag in the launder or tank 3 and be connected to any suitable means for forcing air or other gas into said slag, and a pipe or chute 7 may be provided for supplying a halidizing agent, such as sodium chloride, calcium chloride, magnesium chloride, calcium fluoride, or any alkali-metal chloride, or halide, or alkali-earth-metal chloride, or halide, to the body of air or gas passing through pipe 6 so that the stream of air or gas forced into the body of slag in the tank or launder 3 serves the three-fold purpose of carrying the chloridizing or halidizing agent into the body of slag, of agitating the body of slag, so as to distribute the said agent therethrough, and, also, in case air or other oxygen-bearing gas is used, of taking part in the chemical reaction as hereinafter set forth. Such gas also aids in expelling the volatile halides from the body of slag. Any other suitable means for introducing the chloridizing or halidizing agent may, however, be employed.

In order to collect the fumes or vapor carrying metallic values and volatilized from the body of slag in tank or launder 3 by operation of this process, the said tank is covered over or enclosed, for example, by means of a casing or hood 9, extending over said tank and also over the settling tank 4, so that any vapors or fumes arising from the tank 3 by reason of the reactions therein, or arising from the tank 4 by continuation of such reactions in the slag overflowing into said tank, are retained by said hood and caused to pass off through outlet pipe 10 connected thereto. Said outlet pipe may, if desired, be provided with suitable forced draft means for inducing the draft therethrough to draw the volatilized products from the hood 9 and is connected to any suitable means for receiving the fume-bearing gases or vapors and separating the fume or suspended material therefrom; for example, said outlet pipe 10 may be connected to an electrical precepitator or a bag-house, spray tower, or other means for precipitating, collecting or settling the fume or suspended material containing metallic values.

In order to illustrate the nature of my improvement in the art of metal recovery from molten metallurgical slags, I shall present a concrete example in which copper metallurgical practice is utilized, but I do not limit my operations in any degree to such type of plant or apparatus disclosed, for experience in laboratory investigation has indicated that, for example, in the heat treatment (in the presence of halogen-bearing salts) lead-bearing materials volatilized the lead and its associate metals, such as silver and gold, as halogen-bearing compounds, more readily and they are more completely removed than copper under similar conditions.

The slag produced from copper blast furnaces, copper reverberatory furnaces and copper converters, contain copper in good operating plants in percentages of .30 to .50 percent for the first two and one and one-half percent to four percent for the converter slags. This copper constituent of the slag exists in the mixture of silicate minerals forming the slag in two forms: first, in a dissolved form, which may be either a copper slag or a solution of copper sulfide in the silicate minerals composing the slag; and, second, as suspended particles of matte which, through the incompletion of the gravity separation of the matte and slag in the furnace hearth, are carried away with the slag flow. It is the purpose, and one of the objects of this process, to utilize the slag while in a molten condition, thus providing, because of its elevated temperature and fluid condition, most favorable conditions for the rapid completion of the chemical reaction between the alkali, or alkali-earth halogen salts, which is added thereto and the ease of introduction of the oxygen, or other reacting gas constituents, and of inert carrier gas, by which the formation and removal of the metal halogen salts is effected, and providing through the high existing temperature of the molten slag, temperature and heat sufficient to rapidly and completely expel, either in the gaseous form, or as fume particles, the metallic halogen compounds resulting from the operations above indicated.

My process may be carried out in the apparatus shown in Fig. 1 in the following manner:

The slag which has been received in the settling tank or settler 1, for example, from a reverberatory or blast furnace, and containing a small amount of copper, as above set forth, passes from said tank to the launder or tank 3 wherein it is brought into contact with suitable reagents to cause formation of chlorides or halides of copper and associated metals, and volatilization of same. For this purpose the sodium chloride, calcium chloride, or any halide of an alkali-metal or alkali-earth-metal, or base metal halide, is supplied through the pipe 7 and forced into the body of slag in tank 3 in any suitable manner, being, for example, injected into said slag by a stream of air or gas (for example, furnace gases) supplied through the pipe 6 under pressure sufficient to cause the stream of gas to enter the body of the slag into which the pipe dips, the sodium chloride, or other metallic chloride, or halide, being supplied to this stream of air or gas and being carried therewith into the body of slag.

By reason of the agitation of the body of slag due to the stream of air or gas forced thereinto, effective distribution of the base metal chloride, or halide, throughout the body of slag is assured. In case atmospheric air, or furnace gases, are used as an injecting agent, the oxygen of the air also performs a chemical function, as hereinafter explained, and the nitrogen of the air, constituting an inert gas, also performs the useful function of increasing the agitating effect and serving as a carrier for blowing out or ejecting volatilized material, or vapors of copper chloride, or halide, from the body of the slag, either in gaseous form, or as a fume of solid suspended particles of metallic halogen compound. Other gases, however, may be used for this purpose, for example, steam may be injected through pipe 6, or otherwise, to act as an agitating agent, and for blowing out or ejecting the volatile compounds from the body of slag, such steam also taking part in the chemical reaction in some cases, as hereinafter set forth.

The vapors or fumes driven off from the body of slag in this manner and containing all or part of the metallic values in the slag, are retained by the casing 9 and pass off through the outlet pipe 10 to any suitable means for collecting same, for example, to an electrical precipitator, baghouse, spray tower, settling chamber, or other means. The slag overflows into the settling tank 4 and finally overflows at outlet spout 5. Any volatile compounds formed by later reaction in the settling tank 4, or retained temporarily in the slag and evolved later, while the slag is in settling tank 4, are also collected by casing 9 and pass off through pipe 10 for recovery of the metallic compounds thereof.

While it is an important feature of the present process to utilize the heat present in the slag as it comes from the furnace or smelting apparatus without addition of heat from combustion of fuel, thereby minimizing the cost of operation, it may be necessary in some cases to furnish additional heat during certain stages of the process in order to retain the fluidity of the slag and ensure completion of the reaction and liberation of the volatile compounds. For this purpose, any suitable heating means may be used, for example, a burner, such as indicated at 12, may be provided to heat the slag as it passes into the settling tank 4, or any other part of the apparatus. By this means any tendency of the slag to become too sticky or viscus, for example, in passing through a long launder, may be avoided. In this connection, it is to be noted that the addition of the alkali-metal, or alkali-earth chloride, or fluoride, to the slag tends to increase and to retain its fluidity.

It will be understood that the above described operation does not interfere with the carrying out of the usual settling process as now practiced on the slag after it leaves the blast furnace, any metallic values that settle out of the slag in the chambers 1 and 4, being collected and removed in the usual manner.

My invention may conveniently be carried out by utilization of a converter as a volatilization chamber, as shown in Fig. 2, the settling chamber 1 may discharge by an outlet 2 to a launder 3 by which the slag is conducted into the mouth 14 of a converter 15, which is rotatively mounted in the usual manner, and is provided with a tuyere 16 whereby air or other gas may be injected into the body of slag as it is received in the converter. Sodium chloride, or other halidizing agent, may be supplied to the converter in any suitable manner, for example, through pipe 17, which discharges such material into the mouth of the converter along with the stream of slag, and, if desired, salt or other agent may be forcibly injected into the descending stream of slag by forcing it through the pipe 17 by a blast of air or steam, or other gas.

An outlet pipe 18 extends upwardly from the mouth 14 of the converter when the latter is in an upright position, so as to carry away the gases, vapors or fumes to any suitable precipitating, collecting, or washing means for recovering metallic values volatilized in the converter. It will be understood that when the operation is completed in the converter, the flow of slag will be arrested and the converter turned down for discharging the barren or waste slag therefrom.

As shown in Fig. 3, I may provide for forcibly driving a stream of gas and chloridizing or halidizing agent directly into the stream of descending slag from launder 3, so as to break up the slag into fine particles or spray, thereby, in some cases, increasing the rapidity of reaction and of volatilization. Such gas may consist of air, or of furnace gases, or it may consist of or contain combustible gas, or a mixture of combustible gas and air. Such stream of gas may be supplied through a pipe 20 from which a jet of compressed gas is directed against or into the stream of slag overflowing from the launder 3 into the settling tank 4, suitable chloridizing or halidizing agents, such as sodium chloride, being supplied by pipe 21, or otherwise, to such stream of gas, so as to be driven forcibly thereby into the liquid slag as it descends into the settling tank 4. As the slag is broken up in this manner into fine particles, a maximum surface is thereby exposed for contact with the gases and with the chloridizing or halidizing agent, and rapid reaction and volatilization is thereby ensured. The gases and vapors arising from the slag are collected by hood or casing 23 and conducted through an outlet pipe 24 to suitable precipitating or collecting means for recovering the fume and metallic values therein.

As indicated in Fig. 3, suitable means, such as a burner 25, may be provided for heating the slag while it is in the launder 3, to increase the fluidity thereof, in case it is found in any particular instance that the slag requires such additional heating. In general, however, it is the purpose of this invention to utilize only the original heat in the slag and dispense with any further heating. Sodium chloride, or other metallic halide, may also be introduced into launder 3 by a pipe or supply means 26.

As a chloridizing or halidizing agent, I prefer to use sodium chloride both on account of its cheapness and on account of the fact that it contains a basic constituent that unites readily with the slag while releasing the chlorine for combination with metallic values. Any other metallic chloride, however, may be used which has the property of furnishing chlorine and reacting with the constituents of the slag in the manner stated so that the base or metal of the metallic chloride passes into the slag. In some cases, however, halogen-bearing gases may be used, for example, chlorine gas or waste gases containing more or less chlorine, such gases being forced into the body of slag or in contact with the slag in the same manner as above described in connection with the introduction of atmospheric air.

Because of the difficulty involved in the study of chemical reactions at high temperatures, the chemical reactions involved in the process above outlined are not definitely known, but there is obtained a definite end or final product: namely, a fume carrying metallic halogen compounds, and which fume or dust is carried in suspension by a gas stream and may be recovered as such in suitable means. A suggested line of the chemistry of the process may, however, be given by the following chemical equations, and discussion thereof.

A copper furnace slag normally going to the waste dump is discharged from the furnace in molten condition and normally its temperature on leaving the furnace is considerably over 1000° C. Its actual temperature, however, is dependent upon the slag composition and the general procedure of metallurgical operations. Its flowing temperature may under special conditions run as low as 900° C. and also with other special conditions and composition considerably exceed 1200°. This slag we will say, since it is an average slag we are considering, contains .50 per cent copper and .40 per cent sulfur. As a halogen-bearing salt we will consider sodium chloride as a suitable typical example, although calcium chloride, or calcium fluoride, or other alkali or alkali-earth halogen salts, are of proved suitability.

Apparently it is simplest to consider that either or both chlorine and hydrochloric acid are necessary for the conversion of the metallic values to the chloride form. At the temperature of molten slag, 1000° C., and usually higher, the normal cupric chloride, which is formed at least as a part of the volatilized copper salt at lower temperatures, is completely dissociated according to the following formula:

$$2CuCl_2 \longrightarrow (CuCl)_2 + Cl_2$$

Cuprous chloride $(CuCl)_2$, however, is stable at high temperature and "boils", as given under the heading of "Boiling point" in the literature, between about 954° C. and 1030° C.

Assuming either $Cl_2$ or $HCl$ is essential to the formation of the metallic chlorides desired, it may be derived as follows:

$$2NaCl + SO_2 \longrightarrow Na_2SO_4 + Cl_2$$
$$2NaCl + SO_3 + H_2O \longrightarrow Na_2SO_4 + 2HCl$$

For the copper sulfide present, formation of its halogen compound may be indicated as follows:

$$Cu_2S + 2Cl_2 + 3O \longrightarrow (CuCl)_2 + SO_3$$

In the presence of calcium oxide, which may be added either in the form of limestone or originate from the use of calcium chloride in place of sodium chloride, the following reaction may take place:

$$Cu_2S + CaO + 2O_2 \longrightarrow Cu_2O + CaSO_4$$

followed by:

$$Cu_2O + O \longrightarrow 2CuO$$
$$2CuO + SO_2 + 2NaCl \longrightarrow (CuCl)_2 + Na_2SO_4$$

It may be possible to consider a further step development in the above reactions, noting that the intermediate compounds formed are unstable at the temperature prevailing and that in all probability if formed at all, they are almost instantly converted to produce the end product, as above indicated, for example:

$$2Cu_2S + 5O_2 \longrightarrow 2CuSO_4 + 2CuO$$
$$2CuO + 2SO_2 + O_2 \longrightarrow 2CuSO_4$$
$$CuSO_4 + 2NaCl \longrightarrow CuCl_2 + Na_2SO_4$$
$$2CuCl_2 \longrightarrow (CuCl)_2 + Cl_2$$

For the gold present in the molten slag, an indicative reaction may be expressed as follows:

$$Au + 3Cl \longrightarrow AuCl_3$$

Since it has been shown that at least a portion of the gold volatilized in the presence of halogen salts is recovered from the fume produced in the form of metallic gold, the following reaction also takes place probably after the expulsion of the $AuCl_3$ and as it cools down to an unstable equilibrium condition:

$$2AuCl_3 \longrightarrow 2Au + 3Cl_2$$

For silver a reaction showing the end product may be expressed as follows:

$$Ag_2S + 2Cl + O_2 \longrightarrow 2AgCl + SO_2$$

or, introducing the formation of an intermediate compound:

$$Ag_2S + 2O_2 \longrightarrow Ag_2SO_4$$
$$Ag_2SO_4 + 2NaCl \longrightarrow 2AgCl + Na_2SO_4$$

In the case of lead similar reactions may be assumed.

For that fraction of the metallic values to be volatilized and existing in the silicate form in the molten slag, I may indicate the nature of the reaction without, however, expressing that the formulæ assumed is necessarily that existing:

$$2CuO \cdot SiO_2 + 4NaCl \longrightarrow (CuCl)_2 + 2Na_2O \cdot SiO_2$$

or $$2CuO \cdot SiO_2 + Cl + A_1 \text{ slag (flux)} \longrightarrow (CuCl)_2 + A_2 \text{ slag}$$

or $$2CuO \cdot SiO_2 + HCl + A_1 \text{ slag (flux)} \longrightarrow (CuCl)_2 + A_2 \text{ slag} + H_2O$$

In the presence of FeO, $Al_2O_3$, CaO, MgO, etc., etc., silicates forming the slag, of course, no pure sodium silicate slag would be formed, but a complex mixture or compound of sodium aluminum, etc., silicates or glasses. For a lead silicate, the indicated direction of reaction may be indicated as follows:

$$PbO \cdot SiO_2 + 2NaCl \longrightarrow PbCl_2 + Na_2O \cdot SiO_2$$

Other possible formalæ are possible, incorporating the various step formation compounds or various slag composition. For example, in the presence of $SO_2$ and $O_2$ $Na_2SO_4$ may be formed, which, dependent upon the slag composition and temperature, may or may not be further decomposed to formation of $SO_3$ gas $(SO_2 + \frac{1}{2}O_2)$ and $Na_2O$, in which the latter would enter as a constituent of the slag produced. It is to be noted that the product may not necessarily be recovered as a halogen compound. I have already indicated that gold formed as $AuCl_3$ may be dissociated as its temperature drops from the fusion point of the slag to the ordinary temperature, so that metallic gold appears in the collected fume. It is also to be observed that where sulphur is present in the slag and where $SO_3$ is produced to a certain limited extent, for example:

$$Cu_2S + 4Cl + 3O \longrightarrow (CuCl)2 + SO_3$$

or from a decomposition or slagging of sodium sulphate; that is:

$$Na_2SO_4 + A_1 \text{ slag} \longrightarrow SO_3(SO_2 + O) + A_2 \text{ slag}$$

The $SO_3$ present at the lower temperature, which will exist in the flue system and collection apparatus, may react with the metallic halogen compounds in the presence of the water vapor, which to a certain extent must necessarily be present to yield sulfate compounds of the metals. For example:

$$CuCl_2 + SO_3 + H_2O \longrightarrow CuSO_4 + 2HCl$$
$$PbCl_2 + SO_3 + H_2O \longrightarrow PbSO_4 + 2HCl$$

What I claim is:

1. The process which consists in bringing a molten metallurgical slag in contact with a halidizing agent at sufficiently high temperature in the presence of an oxidizing atmosphere to cause volatilization of metallic values of the slag in the form of halide compounds, and collecting the compounds so volatilized.

2. The process of recovering metallic values from metallurgical slag, which consists in subjecting said slag, while still in melted condition, to the action of a base metal halide in the presence of an oxidizing atmosphere in such manner as to produce and volatilize a halide of a metal contained in the slag, and collecting the halide so volatized.

3. The process of recovering metallic values from metallurgical slag which consists in bringing into contact with the slag, while the latter is still melted and at high temperature and in the presence of an oxidizing atmosphere, a metallic chloride capable of reacting with a metallic constituent of the slag to form a volatile chloride of such metallic constituent, and collecting the chloride so volatized.

4. The process of recovering metallic values from metallurgical slags, which consists in bringing such slag, while in melted condition, in contact with a metallic chloride capable of reacting with a metallic constituent of the slag, and also in contact with an oxidizing gas to aid in such reaction, so as to form and volatilize a chloride of such metallic constituent, and collecting the chloride so volatilized.

5. The process of recovering metallic values from melted metallurgical slag, which consists in introducing a halidizing agent and an oxidizing gas into the melted slag, and introducing into the melted slag a blast of gas, a substantial part of which is inert with respect to the constituents of the slag, such gas serving to mix and agitate the slag and for expelling or blowing out the volatile compounds.

6. The process which consists in treating molten metallurgical slag with a halogen salt of an alkali, or alkaline earth-metal and an oxidizing gas of the slag to produce a volatile halogen compound of said metallic constituent.

7. The process of treating molten metallurgical slags for recovery of metallic values therefrom, which consists in adding a halogen salt of an alkali, or alkaline earth metal to such slag in the presence of an oxidizing gas to increase the fluidity of the slag and to react with a metallic constituent of the slag to produce a volatile halogen compound of such metallic constituent.

8. The process of treating molten slags coming from metallurgical furnaces, which consists in bringing said slags, while still hot and without the addition of heat from combustion of fuel, into contact with an oxidizing gas and halogen-bearing material capable of reacting with a metallic constituent of the slag to form a volatile compound of such constituent, and collecting such compound evolved from the slag.

9. The process of treating molten metallurgical slag, which consists in bringing said molten slag into contact with a metallic halogen compound in the presence of water vapor and of oxygen bearing gas, and collecting the fumes thereby produced and evolved from the slag.

10. The process which consists in bringing molten metallurgical slag in contact with metallic halogen compound in the presence of water vapor and forcing gas containing oxygen and an inert constituent through the slag to aid in the formation and volatilization of a volatile metallic compound from a metallic constituent of the slag.

In testimony whereof I have hereunto subscribed my name this 19th day of August, 1920.

HARRY V. WELCH.